US012510436B2

(12) United States Patent
Schuebel

(10) Patent No.: US 12,510,436 B2
(45) Date of Patent: Dec. 30, 2025

(54) METHOD FOR DETERMINING VIBRATION BEHAVIOR OF AN ELECTRIC MOTOR AND/OR OF ITS INSTALLATION ENVIRONMENT, AND CORRESPONDING ELECTRIC MOTOR AND FAN

(71) Applicant: ZIEHL-ABEGG SE, Künzelsau (DE)

(72) Inventor: Dominik Schuebel, Kunzelsau (DE)

(73) Assignee: ZIEHL-ABEGG SE, Künzelsau (DE)

( * ) Notice: Subject to any disclaimer, the term of this patent is extended or adjusted under 35 U.S.C. 154(b) by 129 days.

(21) Appl. No.: 18/556,791

(22) PCT Filed: Apr. 27, 2022

(86) PCT No.: PCT/DE2022/200076
§ 371 (c)(1),
(2) Date: Oct. 23, 2023

(87) PCT Pub. No.: WO2022/233373
PCT Pub. Date: Nov. 10, 2022

(65) Prior Publication Data
US 2024/0201043 A1  Jun. 20, 2024

(30) Foreign Application Priority Data
May 4, 2021 (DE) .................. 10 2021 204 463.8

(51) Int. Cl.
*G01M 7/02* (2006.01)
*H02P 3/22* (2006.01)

(52) U.S. Cl.
CPC .............. *G01M 7/025* (2013.01); *H02P 3/22* (2013.01)

(58) Field of Classification Search
CPC . G01M 7/025; G01M 7/00; H02P 3/22; H02P 3/06; H02P 29/50; H02P 23/04; H02K 2209/00; G01H 13/00; G01H 1/003
(Continued)

(56) References Cited

U.S. PATENT DOCUMENTS 6,289,735 B1 *  9/2001  Dister ................... G01H 1/003
                                                    73/659
8,903,608 B2 * 12/2014  Niemz .............. B60W 60/0059
                                                    701/25
(Continued)

FOREIGN PATENT DOCUMENTS

| CN | 108871827 | 11/2018 |
| CZ | 304632    | 8/2014  |
| EP | 3291425   | 3/2018  |

OTHER PUBLICATIONS

International Preliminary Report on Patentability issued in App. No. PCT/DE2022/200076, dated Oct. 24, 2023, 10 pages.

*Primary Examiner* — David Luo
(74) *Attorney, Agent, or Firm* — FisherBroyles, LLP; Jason P. Mueller

(57) ABSTRACT

A method is disclosed for determining a vibration behavior of an electric motor, in particular an electric motor of a fan, and/or its installation environment, wherein a rotary motion of a rotor of the electric motor can be braked in a braking process. The disclosed method comprises generating a jolt by triggering a braking process or an acceleration process or by changing a braking process or an acceleration process, generating detected vibration values by detecting vibrations of at least a part of the electric motor by means of at least one vibration sensor, determining spectral components by means of a frequency analysis of the detected vibration values, and determining a vibration behavior of the electric motor and/or its installation environment by evaluating the spectral components. Further disclosed is a corresponding electric motor, fan, and system, each of which may be configured to carry out the method.

18 Claims, 4 Drawing Sheets

(58) Field of Classification Search
USPC .......................... 318/119, 126, 127, 128, 490
See application file for complete search history.

(56) References Cited

U.S. PATENT DOCUMENTS

| | | | |
|---|---|---|---|
| 10,191,482 B1* | 1/2019 | Li | G05B 23/0264 |
| 10,240,996 B2* | 3/2019 | Oohara | G01M 13/02 |
| 2014/0180606 A1 | 6/2014 | Anuzis | |

* cited by examiner

METHOD FOR DETERMINING VIBRATION BEHAVIOR OF AN ELECTRIC MOTOR AND/OR OF ITS INSTALLATION ENVIRONMENT, AND CORRESPONDING ELECTRIC MOTOR AND FAN

CROSS REFERENCE

This application is a national stage entry application under 35 U.S.C. 371 of PCT Patent Application No. PCT/DE2022/200076, filed on 27 Apr. 2022, which claims priority to German Patent Application No. 10 2021 204 463.8, filed on 4 May 2021, the entire contents of each of which are incorporated herein by reference.

FIELD

The present disclosure relates to a method for determining a vibration behavior of an electric motor, in particular an electric motor of a fan, and/or its installation environment, as well as to an electric motor, a fan and a system, which are each configured for carrying out the method.

BACKGROUND

When an electric motor is operated—whether properly or improperly—vibrations are excited. These vibrations may originate from the electric motor itself and/or be excited by a load driven by the electric motor (for example, an impeller of a fan) and/or by an installation environment of the electric motor. In practice, harmonic excitations (for example, due to imbalances), stochastic excitations (for example, due to noise), or pulse-like excitations (for example, due to shocks or shock sequences) can occur. Resonances can occur when these excitations stimulate a structure-specific proper motion. Such resonances lead to vibration overshoots.

Many resonances, in particular resonances caused by imbalances, are dependent on the speed of the electric motor. Since resonances have a negative effect on the operation of the electric motor, for example through increased noise generation or by impairing the service life of the electric motor, efforts are made to avoid operating the electric motor at speeds causing resonances as far as possible. This can be done, for example, by quickly overrunning these speeds and/or not allowing operation at these speeds. In particular with a fan, this approach is usually possible without any problems.

If operation at a resonance point is to be avoided, the speeds at which resonances are caused must be known. For this purpose, it is known to measure an electric motor in a test bench after production. Since these speeds have various influencing factors and are mostly dependent on the respective installation situation of the electric motor, determining resonance points in a test bench before delivery of the electric motor is often not sufficient. Therefore, electric motors are known in which sensors are installed for vibration detection. Such an electric motor is described, for example, in DE 10 2018 211 838 A1 and DE 10 2018 211 846 A1.

The detection of resonance points requires scanning of vibrations of the electric motor. For fans in particular, this scanning usually occurs during a run-up or a run-down. During a run-up, the fan is accelerated from a minimum speed (usually a standstill of the fan) to a maximum speed in a given time, ideally with a linear speed ramp. During a run-down, the speed is reduced from a non-zero starting speed (usually maximum speed) to a minimum speed. In both cases, the vibrations of the electric motor are detected and evaluated as a function of the speed. For such a detection of a vibration behavior, reference is made to DE 20 2019 101 262 U1 and DE 10 2018 211 850 A1 by way of example.

If a detected vibration value exceeds a predefined limit, for example 7 millimeters/second (RMS—root mean square) or 9 millimeters/second (RMS), it is deducted that a resonance point is present. Such limits are often defined in standards or other regulations, for example ISO14694. All speeds at which this limit is exceeded can be recorded as "forbidden" speeds and—as far as possible—omitted or quickly overrun during subsequent operation.

A disadvantage of such an evaluation of the vibration behavior is that a run-up or a run-down is required. In application scenarios where resonances are invariable, such a test run during commissioning of the electric motor is sufficient. In practice, however, resonance points change, for example as a result of deposits or wear/aging or changes in the installation environment of the fan, for example due to adjustments or expansion of the system or maintenance. In such cases, it is at least occasionally necessary to perform a new test run. This requires additional maintenance windows, which can lead to significant costs, in particular for electric motors used in continuous operation.

SUMMARY

The underlying problem of the present disclosure is designing and further developing a method, an electric motor, a fan, and a system of the above-mentioned type in such a way that a vibration behavior of the electric motor and/or its installation environment can be determined by simple means and, if possible, without time-consuming measurement methods.

The above problem is solved according to the disclosure, in an embodiment, by the features of claim 1. The respective method comprises the following steps:
  generating a jolt by triggering a braking process or an acceleration process or by changing a braking process or an acceleration process,
  generating detected vibration values by detecting vibrations of at least a portion of the electric motor using at least one vibration sensor,
  determining spectral components by means of a frequency analysis of the detected vibration values, and
  determining a vibration behavior of the electric motor by evaluating the spectral components.

The above problem with respect to a method is solved according to the disclosure, in an embodiment, by the features of coordinate claim 13. According to this, the electric motor in question comprises:
  a rotor which is mounted for rotating about an axle/shaft,
  a jolt generating device for generating a jolt by triggering a braking process or an acceleration process or by changing a braking process or an acceleration process,
  a vibration sensor configured to detect vibrations of at least part of the electric motor and to generate detected vibration values,
  an analysis unit configured to determine spectral components of the detected vibration values, and
  an evaluation unit configured to evaluate the vibration behavior by evaluating the spectral components.

The above problem with respect to a fan is solved by the features of the other coordinate claim 16, in an embodiment. Accordingly, the fan in question comprises an impeller and an electric motor according to the disclosure, wherein the impeller is coupled to a rotor of the electric motor.

The above problem with respect to a system is solved by the features of the other coordinate claim 17, in an embodiment. Accordingly, the system comprises an installation environment and a drive, wherein the drive comprises an electric motor according to the disclosure and/or a fan according to the disclosure, wherein the installation environment interacts with the drive, and wherein the drive is configured to detect and evaluate vibrations of the drive as well as vibrations of the installation environment.

In accordance with the disclosure, it was first found that the vibration behavior of the electric motor and the installation environment can be easily determined by a single event, which can avoid a run-up or run-down. According to the disclosure, a "jolt" is generated for this purpose by a braking or acceleration process or by changing a braking or acceleration process. In the case of a braking process, the "jolt" can also be referred to as a "brake shock," and in the case of an acceleration process, as an "acceleration shock." Generally speaking, the jolt is triggered by suitably controlling/regulating the rotary motion of the rotor.

When braking a rotor of the electric motor, moments of inertia counteract the braking process. This makes it possible to achieve a mechanical excitation of the system of the electric motor and the installation environment that is not unlike the striking of a tuning fork. When a tuning fork is struck, a pulse excites the structure—namely the tuning fork—to vibrate, which is determined by the structure's natural frequency. A "brake shock" has a very similar effect on an electric motor. The resulting excitation stimulates the structure—in this case the electric motor together with its installation environment—to vibrate, which is determined by the structure's natural frequencies. In this way, the vibration behavior of the installation environment and/or the electric motor can be deducted by detecting vibrations of at least part of the electric motor immediately after a "brake shock."

Analogous explanations apply in the case of an "acceleration shock." It is true that, in addition to the vibrations caused by the acceleration shock, there are also vibrations caused by the rotary motion of the rotor. However, this is of secondary importance for determining the vibration behavior, since the rotary motion-related vibrations describe the vibration behavior of the electric motor in exactly the same way as the vibrations caused by the "acceleration shock."

In a method according to the present disclosure, a jolt is generated by triggering a "brake shock" or an "acceleration shock." This is done by a braking process, an acceleration process, a change of a braking process, or a change of an acceleration process. Vibrations caused by the "brake shock" or the "acceleration shock" are detected by a vibration sensor, and the detected vibration values generated in the process are subjected to a frequency analysis. This analysis determines spectral components that can be evaluated for determining the vibration behavior of the electric motor and/or its installation environment.

An electric motor according to the present disclosure includes a rotor, a jolt generating device, a vibration sensor, an analysis unit, and an evaluation unit. The rotor is mounted for rotating about an axis or shaft. The jolt generating device can initiate or change a braking process or initiate or change an acceleration process. The vibration sensor can detect vibrations of at least a portion of the electric motor and generate detected vibration values therefrom. The analysis unit can determine spectral components of the detected vibration values, which are evaluated by the evaluation unit. In addition, other units may be present, for example analog-to-digital converters for digitally converting sensor signals from the vibration sensor, integrators/differentiators for converting to another vibration quantity, or bandpass filters for filtering the vibration values.

The present disclosure may be used in connection with a wide variety of electric motors and a wide variety of loads driven by the electric motor. As long as a jolt can be generated that sufficiently excites the electric motor and the installation environment of the electric motor to vibrate, this electric motor can be used in connection with the present disclosure. For this purpose, the electric motor should not usually be too small. Usually, such an electric motor is likely to have a power of several hundred watts, and in some embodiments several kilowatts or more. Especially when an "acceleration shock" is useful, it can also be useful if the rotor and/or a load driven by the rotor has a sufficiently large moment of inertia. The electric motor itself can be configured as an electronically commutated motor. An impeller can be used as the load of the electric motor, whereby the impeller is coupled to the rotor of the electric motor and the electric motor is thus part of a fan. The fan can be configured in a variety of ways. Examples include axial fans or centrifugal fans.

The term "installation environment" can refer to anything with which the electric motor interacts in terms of vibration. This means that the installation environment can transmit vibrations to the electric motor and the electric motor can transmit vibrations to the installation environment. The installation environment may include, for example, a mount of the electric motor, a system component of a system including the electric motor, an outer housing, a load driven by the electric motor, and/or the like.

The "vibration sensor" can also be configured in various ways, as long as this vibration sensor is capable of detecting vibrations from at least one part of the electric motor. Various techniques can be used. The use of MEMS (micro-electro-mechanical system) sensors is merely an example.

The "jolt generating device" can be configured in various ways. It may be present as a dedicated unit or formed by another component of the electric motor. If the jolt generating device is to produce an "acceleration shock," the jolt generating device may be formed, for example, by the actual drive of the electric motor, that is, a stator and the rotor interacting with it. When creating an "acceleration shock," the transition from constant acceleration (to a certain speed or operating point) to constant operating conditions can be used. However, acceleration from an initial speed to a final speed can also be used, wherein a standstill of the rotor or a non-zero speed can be used as the initial speed. Acceleration time should not be too long to trigger a sufficiently pronounced "acceleration shock." Acceleration times of less than or equal to 10 seconds, less than or equal to 5 seconds, and even less than or equal to 3 seconds are likely suitable.

If the jolt generating device is to cause a "brake shock," this can be formed by a "braking device." Such a "braking device" can be implemented in a wide variety of ways. It is important that the braking device is able to brake the rotor of the electric motor in a targeted manner. How this is done in detail is secondary. In one embodiment, the braking device is formed by a mechanical brake with which rotational energy is converted into heat by friction. In another embodiment, the braking device is formed by an electric brake with which the rotor is braked by means of magnetic fields. This can be done, for example, by suitable fields in the stator and/or by generating a current in the rotor. The latter can occur due to electrical resistance on windings of the rotor up to a short circuit, wherein the current flow is driven by a voltage induced by the rotary motion of the rotor in a stator magnetic field.

In one embodiment, the jolt is triggered by a braking process and generating a jolt comprises bringing the rotor to an initial speed and triggering a braking process to reduce a speed of the rotor from the initial speed over a braking time to a final speed. In this way, a "brake shock" can be generated particularly effectively.

A wide variety of rotor speeds can be used as the "initial speed" as long as the initial speed is sufficiently different from zero to cause a "brake shock" during a braking operation. In principle, the initial speed can be the rated speed of the electric motor. In most cases, however, initial speeds well below the rated speed or maximum speed will be sufficient.

Accordingly, the "final speed" can be formed by a wide variety of speeds. It is essential that the final speed is lower than the initial speed and that a sufficient "brake shock" is produced during the braking process. It can also be useful if no or at most only slight vibrations occur at the final speed as a result of the rotor still rotating. The final speed can be a standstill of the rotor—that is, at a speed equal or close to zero.

The "braking time" is likely to be defined as a function of the electric motor used, the initial speed, and/or the final speed. Here, too, it is important that the braking process is short enough to produce a sufficient "brake shock." At the same time, the braking time should not be too short to avoid having to handle massive mechanical loads caused by the braking process. Therefore, braking times that are in the range of a few seconds may be suitable.

In one embodiment, "bringing to initial speed" may be accomplished by explicitly accelerating or, if necessary, decelerating the rotor to the initial speed in a test mode. In another embodiment, the method may be used at the beginning of a pause in operation of the electric motor. In this case, bringing to initial speed can be done by coasting or "soft" braking the rotor, and when the initial speed is reached, the actual braking process of the process can be initiated with a "brake shock."

In one embodiment, determining the vibration behavior involves identifying one or more resonance points and evaluating their criticality. In this way, an important part of the vibration behavior can be determined. In principle, a wide variety of methods known from practical experience can be used for this purpose. In a further development, the presence of a resonance point is decided if a spectral component exceeds a predetermined limit. In another further development, the presence of a resonance point is decided when detected oscillations are dominated by an order of a weighting frequency. Such a method is described, for example, in German patent application 10 2021 203 932.4.

In one embodiment, determining the vibration behavior involves determining at least one vibration mode, wherein the at least one vibration mode includes, for example, tilting, wobbling, torsion, and/or axial pumping. A type of vibration describes how the electric motor and/or its installation environment actually vibrates. In this way, various conclusions can be drawn that may be of importance for the operation of the electric motor. A tilt describes whether and how the electric motor tilts about an axis. A wobble describes how an axis of rotation of the rotor changes. Tilting and tumbling can be expressed in first orders of vibrations. A torsion describes how the electric motor twists about an axis, usually the motor axle/motor shaft, or relative to attachments (for example, a nozzle of a fan), and suggests pendulum torques. Axial pumping may depend on the driven load. For example, in an axial fan, axial pumping may depend on the number of blades. It can be seen that determining an oscillatory shape allows the vibration behavior to be further specified.

In one embodiment, synchronization is performed between the jolt and the generation of detected vibration values, wherein the synchronization is may be performed by motor electronics of the electric motor and/or by detection of a peak in a sensor signal of the at least one vibration sensor. Synchronization allows a more targeted processing of the detected vibration values. The use of motor electronics for synchronization is particularly useful if parts of the units used here, for example the analysis unit or the evaluation unit, are implemented in the motor electronics and/or the motor electronics controls the braking process. Detection of peaks is possible in particular because the triggering of the braking process can cause distinct vibration peaks that are easily identifiable in the detected vibration values. But other events can also cause a vibration peak, for example when the rotor comes to a standstill.

In one embodiment, the vibrations of at least a part of the electric motor are detected along at least one axis, and, in an embodiment, along a plurality of axes, wherein the at least one axis or one of the multiple axes is arranged parallel to an axis of rotation of the rotor. In this way, the vibrations can be detected particularly effectively and comprehensively. If there are several axes, they can be perpendicular to each other. For example, the vibration sensor can measure along three axes that are perpendicular to each other in pairs and wherein one axis is parallel to the motor axle/motor shaft.

In one embodiment, the braking process involves rapid braking, for instance, short-circuit braking. Rapid braking allows the rotor to decelerate quickly yet in a controlled manner. Short-circuit braking enables a very high brake shock.

In one embodiment, the generation of detected vibration values is started when the braking process is triggered and/or the final speed is reached. A start when the braking process is triggered enables the use of the braking peak. A start when the final speed is reached allows the use of a peak at the end of the braking process, which means that the detected vibrations should practically no longer be influenced by the rotary motion of the rotor. In both cases, the vibrations can also be measured continuously, and/or vibration values can be buffered in a temporary memory. In this way, the detected vibration values can also be detected shortly before the braking process is triggered or before the final speed is reached.

In one embodiment, the initial speed is greater than or equal to 100 rpm, greater than or equal to 200 rpm and/or the initial speed is less than or equal to 30% of the rated speed of the electric motor, less than or equal to 20% of the rated speed of the electric motor, or less than or equal to 10% of the rated speed of the electric motor. In many cases, an initial speed of 100 rpm is sufficient for determining the vibration behavior. At an initial speed of 200 rpm, the brake shock is even more pronounced. An initial speed less than or equal to 30% of the rated speed enables the process to be carried out quickly with a pronounced brake shock at the same time, since the initial speed can be approached quickly from the standstill of the rotor. At 20% of the rated speed, the rotor is brought up to the initial speed even more quickly. At 10% of the nominal speed, the process is completed particularly quickly and yet a sufficiently strong brake shock is possible.

In one embodiment, the final speed is less than or equal to 50 revolutions per minute, less than or equal to 25 revolutions per minute, or equal to 0. At a final speed of less than or equal to 50 rpm, the vibrations are practically no longer influenced by the remaining rotary motion of the rotor. If the final speed is less than or equal to 25 rpm, the remaining rotary motion has an even smaller influence. A final speed of 0 excludes the influence of the rotary motion and also allows the use of a standstill peak in the vibration values.

In one embodiment, the braking time is selected to be less than or equal to 10 seconds, less than or equal to 5 seconds, or less than or equal to 3 seconds. It should be noted that the braking time is not a rigid requirement for the braking process, which must be set by controlling the braking force, for example. Instead, it is sufficient if the braking process is completed approximately in the braking time. Usually, the braking time can be estimated well by specifying the braking, in particular since moments of inertia, braking forces and other quantities affecting the braking time are usually known or can be estimated.

In one embodiment, a Fourier transform, for instance an FFT—fast Fourier transform—and/or a Görtzel algorithm is used to generate spectral components. A Fourier transform or FFT offers the advantage that extensive knowledge of spectral components can be obtained. The Görtzel algorithm enables a particularly efficient determination of the spectral components. This is particularly advantageous if prior knowledge of potentially existing vibrations and/or resonance points is already available.

In one embodiment, the vibration sensor is integrated in the electric motor or disposed on an exterior of a housing of the electric motor and/or in an electronics housing of the electric motor. Integration of the vibration sensor in the electric motor offers the advantage that the vibrations can be detected very well and in a well-defined manner. Furthermore, time synchronization between triggering the braking process and detecting the vibrations can be simplified. A vibration sensor on an outer side of the motor housing offers good retrofittability of existing electric motors in particular. In both cases, that is, when integrating or externally mounting the vibration sensor, the use of an electronics housing offers the advantage that electronics and/or power supply available in the electronics housing can also be used. For example, a microcontroller of the electronics can be used to process software for implementing the analysis unit or the evaluation unit. At the same time, an analog-to-digital converter of the microcontroller can be used to digitize sensor signals of the vibration sensor.

In one embodiment, the electric motor comprises motor electronics that controls the electric motor during its operation, wherein the motor electronics uses a determined vibration behavior to control the electric motor and thereby avoids speeds of the electric motor with unfavorable vibration behavior. In this way, the specific vibration behavior can improve the operation of the electric motor. Speeds with unfavorable vibration behavior can result from spectral components with unfavorable vibration behavior. The speeds can be calculated from the spectral components multiplied by 60 and divided by orders of the vibrations (multiples of a fundamental frequency). The motor electronics can also control and/or regulate the braking process.

There are various ways of advantageously developing and improving the teaching of this disclosure. We refer to the claims that are subordinate to the coordinate claims and the explanation of an embodiment of the disclosure with reference to the figure. Generally embodiments and further developments of the teaching are described in conjunction with explaining an exemplary embodiment of the disclosure based on the drawings.

DETAILED DESCRIPTION OF THE DISCLOSURE

Figure 1:
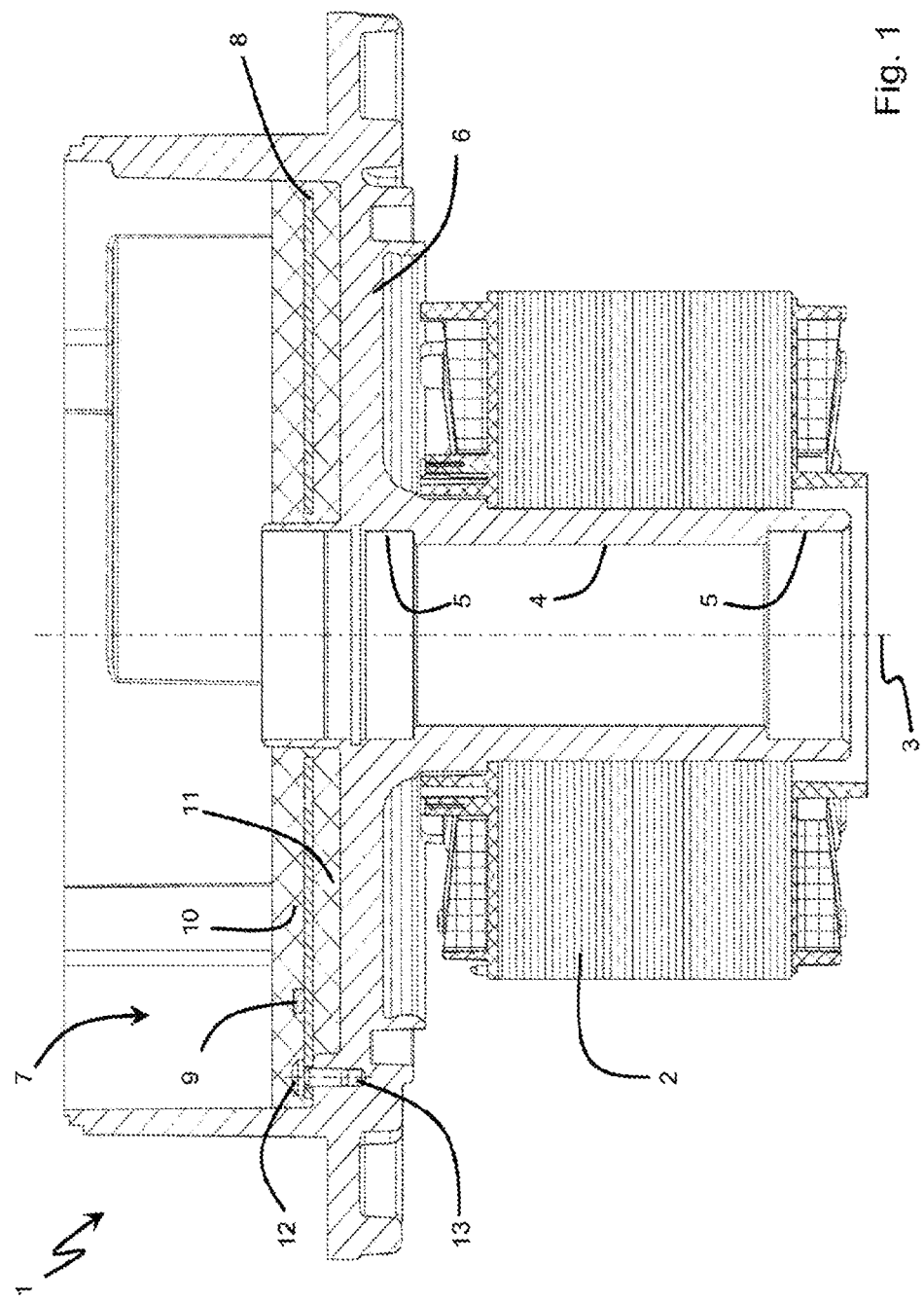
FIG. 1 shows a sectional view of an embodiment of an electric motor according to the present disclosure.

FIG. 1 shows a section through a stator 2 of an embodiment of an electric motor 1 according to the present disclosure. A bearing tube 4 is formed on a motor axle 3, and a bearing mounting area 5 is formed at each of its longitudinal ends. Bearings not shown are accommodated in the bearing mounting areas 5, via which a shaft of the electric motor, also not shown, is rotatably mounted. A stator bushing 6 is formed by an aluminum component, at one end of which the bearing tube 4 is formed and at the other end of which an electronics housing 7 is formed to accommodate motor electronics. The motor electronics respectively generates supply signals and outputs them to the stator and/or rotor windings. For the sake of clarity, only one printed circuit board 8 of the motor electronics is shown. A vibration sensor 9 is arranged on the printed circuit board 8. The printed circuit board 8 is embedded in a potting compound 10, 11, wherein the potting compound 10, 11 is bonded to the edge region of the printed circuit board 8. In particular, the potting compound 10 acts as a coupling element and transmits vibrations from the stator bushing 6 to the printed circuit board 10 and thus to the vibration sensor 9. As a further coupling element, a screw 12 is provided which is screwed into a hole 13 in the electronics housing 7. In this way, the vibration sensor 9 can be arranged in an electric motor and detect vibrations of at least a part of the electric motor. Such an electric motor may be used in the method disclosed herein.

Figure 2:
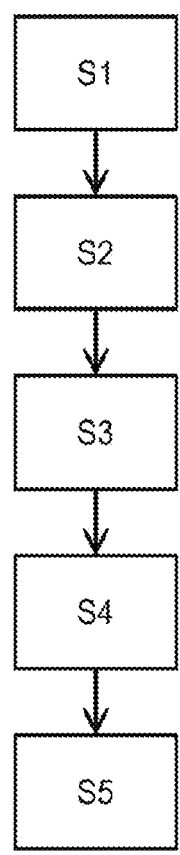
FIG. 2 shows a flowchart showing steps of an embodiment of a method according to the present disclosure.

FIG. 2 shows a flowchart of an exemplary embodiment of a method according to the present disclosure, wherein in this embodiment example a "brake shock" is triggered. In step S1, the rotor is brought to an initial speed. This initial speed is, for example, 200 revolutions per minute. In step S2, a braking process is initiated which brakes the rotor of the electric motor from the initial speed to a final speed—in this case, standstill of the rotor. In step S3, vibrations of at least a part of the electric motor are detected by means of a vibration sensor, and detected vibration values are generated. The vibration sensor 9 of the electric motor according to FIG. 1 can be used here. In step S4, spectral components are determined by subjecting the acquired vibration values to a frequency analysis, for example an FFT. In step S5, the vibration behavior of the electric motor and/or its installation environment is determined. For this purpose, the determined spectral components are evaluated.

Figure 3:
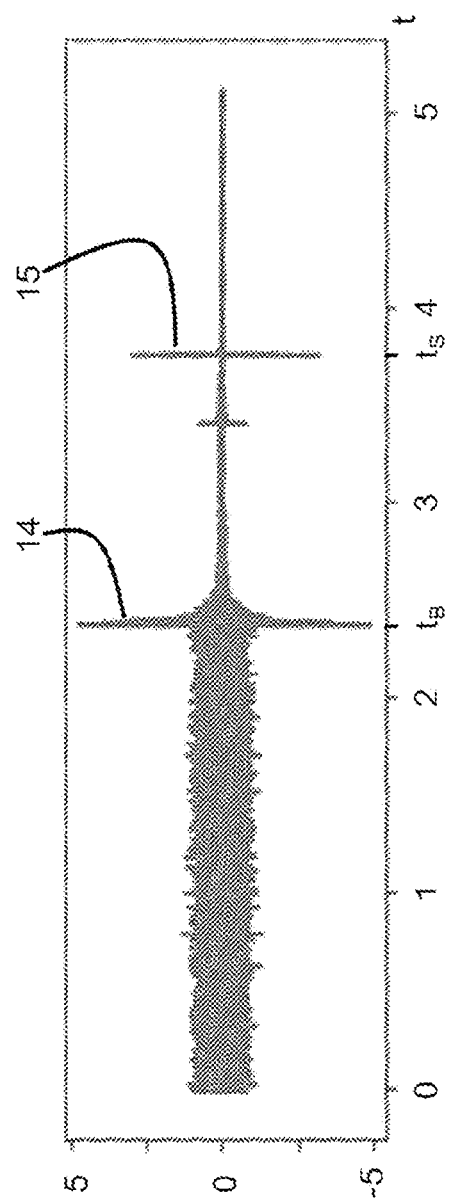
FIG. 3 shows a diagram with exemplary time data of detected vibration values along a z-axis.

FIG. 3 shows an exemplary curve of a time signal of a vibration sensor, wherein an acceleration value (in $m/s^2$) for a vibration parallel to the motor axle/motor shaft is shown over time (in seconds). At the beginning, vibration values are measured which result from the rotary motion of the electric motor at the initial speed. At time $t_B$—approximately after 2.3 seconds in the time scale shown—a braking process is initiated which leads to a braking peak 14. In the following approx. 1.4 seconds, the rotor is decelerated such that the rotor comes to a standstill at time $t_S$—at approx. 3.7 seconds. The standstill leads to a standstill peak 15. To determine the vibration behavior, the vibration values from the standstill peak 15 are detected and evaluated as an example.

Figure 4:
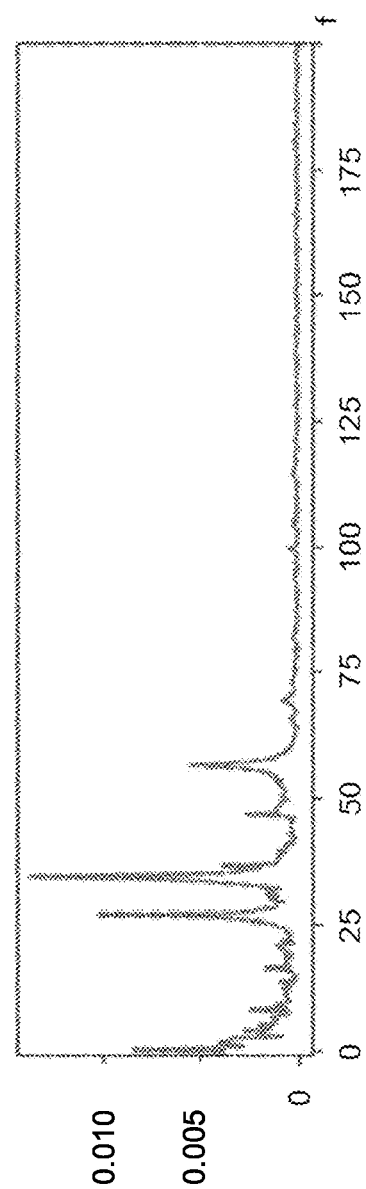
FIG. 4 shows a diagram with a frequency analysis of the time data according to FIG. 3.

FIG. 4 shows spectral components of the time signal according to FIG. 3 from the standstill peak 15. An amplitude of the spectral component (in m/s$^2$) is plotted against the frequency (in Hertz). It can be seen that in addition to a peak at a frequency of 0 Hertz, three distinct peaks are formed: at about 27 Hertz, at about 35 Hertz, and at about 58 Hertz. From this, potential resonance points can be identified. If it is assumed that each resonance point is a first-order resonance point, this theoretically results in critical speeds at 1620 rpm, 2100 rpm, and 3480 rpm. With an electric motor that can rotate at a maximum of 2400 rpm, for example, at most the first two speed values mentioned can be problematic. The third resonance point may exist, but in a practical operation it can only be relevant for a higher order excitation.

For further advantageous embodiments and to avoid repetition, see the general part of the description above and the appended claims.

Finally, it should be expressly noted that the exemplary embodiments described above are only used to explain the claimed teaching but do not limit this teaching to these exemplary embodiments.

LIST OF REFERENCE SYMBOLS

1 Electric motor
2 Stator
3 Motor axle
4 Bearing tube
5 Bearing mounting area
6 Stator bushing
7 Electronics housing
8 Circuit board
9 Vibration sensor
10 Potting compound
11 Potting compound
12 Screw
13 Hole
14 Brake peak
15 Standstill peak

The invention claimed is:

1. A method for determining a vibration behavior of an electric motor, in particular an electric motor of a fan, and/or its installation environment, wherein a rotary motion of a rotor of the electric motor can be braked in a braking process, comprising:
    generating a jolt by triggering a braking process or an acceleration process or by changing a braking process or an acceleration process,
    generating detected vibration values by detecting vibrations of at least a part of the electric motor by means of at least one vibration sensor,
    determining spectral components by means of a frequency analysis of the detected vibration values, and
    determining a vibration behavior of the electric motor and/or its installation environment by evaluating the spectral components, wherein when determining the vibration behavior, one or more resonance points are determined and their criticality is evaluated, wherein the presence of a resonance point is decided if one of: a spectral component exceeds a predetermined limit; and if detected vibrations are dominated by an order of an evaluation frequency.

2. The method according to claim 1, wherein generating a jolt by means of a braking process comprises bringing the rotor to an initial speed and triggering a braking process to reduce a speed of the rotor from the initial speed to a final speed over a braking time.

3. The method according to claim 2, wherein the generation of detected vibration values is started when at least one of: the braking process is triggered; and the final speed is reached.

4. The method according to claim 2, wherein the initial speed is one of: greater than or equal to 100 revolutions per minute and greater than or equal to 200 revolutions per minute, and wherein the initial speed is one of: less than or equal to 30% of the rated speed of the electric motor; less than or equal to 20% of the rated speed of the electric motor and less than or equal to 10% of the rated speed of the electric motor.

5. The method according to claim 2, wherein the final speed is one of: less than or equal to 50 revolutions per minute; less than or equal to 25 revolutions per minute and equal to 0.

6. The method according to claim 2, wherein the braking time is chosen to be one of: less than or equal to 10 seconds; less than or equal to 5 seconds; and less than or equal to 3 seconds.

7. The method according to claim 1, when determining the vibration behavior, at least one type of vibration is determined, wherein the at least one type of vibration comprises at least one of tilting, wobbling, torsion, and axial pumping.

8. The method according to claim 1, wherein synchronization is performed between the jolt and the generation of detected vibration values, wherein the synchronization is performed by at least one of: motor electronics of the electric motor; and by detection of a peak in a sensor signal of the at least one vibration sensor.

9. A method according to claim 1, wherein the vibrations of at least a part of the electric motor are detected along at least one axis.

10. A method according to claim 9, wherein the vibrations of at least a part of the electric motor are detected along multiple axes, wherein the at least one axis or one of the multiple axes is arranged parallel to an axis of rotation of the rotor.

11. The method according to claim 1, wherein rapid braking is performed during the braking process.

12. The method according to claim 11, wherein the rapid braking is short circuit braking.

13. The method according to claim 1, wherein at least one of a Fourier transform and a Görtzel algorithm is used to generate spectral components.

14. An electric motor configured to perform a method according to claim 1, comprising:
    a rotor which is mounted for rotating about an axle/shaft,
    a jolt generating device for generating a jolt by triggering a braking process or an acceleration process or by changing a braking process or an acceleration process,
    a vibration sensor configured to detect vibrations of at least part of the electric motor and to generate detected vibration values,
    an analysis unit configured to determine spectral components of the detected vibration val-ues, and an evaluation unit configured to evaluate the vibration behavior by evaluating the spectral components.

15. The electric motor according to claim 14, wherein the vibration sensor is integrated in the electric motor or arranged on an outside of a housing of the electric motor and/or in that the vibration sensor is arranged in an electronics housing of the electric motor.

16. The electric motor according to claim 14 further comprising motor electronics which controls the electric motor during its operation, wherein the motor electronics uses a determined vibration behavior to control the electric motor and thereby preferably avoids speeds of the electric motor with unfavorable vibration behavior.

17. A system comprising an installation environment and a drive, wherein the drive comprises an electric motor and a fan according to claim 16, wherein the installation environment interacts with the drive, and wherein the drive is configured to detect and evaluate both vibrations of the drive and vibrations of the installation environment.

18. A fan, comprising an impeller and an electric motor according to claim 14, wherein the impeller is coupled to a rotor of the electric motor.

* * * * *